US008643747B2

(12) United States Patent  
Chou

(10) Patent No.: US 8,643,747 B2  
(45) Date of Patent: Feb. 4, 2014

(54) IMAGE CAPTURING DEVICE AND IMAGE CORRECTION METHOD THEREOF

(75) Inventor: Chan-Min Chou, New Taipei (TW)

(73) Assignee: Altek Corporation, Hsinchu (TW)

( * ) Notice: Subject to any disclaimer, the term of this patent is extended or adjusted under 35 U.S.C. 154(b) by 493 days.

(21) Appl. No.: 13/107,649

(22) Filed: May 13, 2011

(65) Prior Publication Data

US 2012/0194701 A1 Aug. 2, 2012

(30) Foreign Application Priority Data

Jan. 27, 2011 (TW) .............................. 100103113 A

(51) Int. Cl.  
*H04N 5/262* (2006.01)

(52) U.S. Cl.  
USPC ........................................................ 348/239

(58) Field of Classification Search  
USPC ........................................................ 348/239  
See application file for complete search history.

(56) References Cited

U.S. PATENT DOCUMENTS

| 2004/0264779 A1* | 12/2004 | Anderson | 382/218 |
| 2005/0206736 A1* | 9/2005 | Ng et al. | 348/208.7 |
| 2008/0002023 A1* | 1/2008 | Cutler | 348/36 |

* cited by examiner

*Primary Examiner* — James Hannett  
(74) *Attorney, Agent, or Firm* — Wang Law Firm, Inc.; Li K. Wang; Stephen Hsu

(57) ABSTRACT

An image capturing apparatus and an image correction method thereof are provided. The image capturing apparatus comprises an image capturing module, a sensing module, a storage module, and a processing module. The image capturing module captures an image. The sensing module senses an included angle between the image capturing apparatus and a horizontal plane. The storage module stores a rotation compensation data table containing a plurality of offset angles and a plurality of rotation compensation values for pixels corresponding to each offset angle. According to a difference value between the angle and a preset angle, the processing module finds out the appropriate rotation compensation values in the rotation compensation data table for rotating and correcting the image. A calibrated image is then generated, and the calibrated image matches the image captured by the image capturing device at the preset angle.

14 Claims, 6 Drawing Sheets

IMAGE CAPTURING DEVICE AND IMAGE CORRECTION METHOD THEREOF

BACKGROUND OF THE INVENTION

1. Field of the Invention

The present invention relates to an image capturing device and an image correction thereof, and more particularly to an image capturing device and an image correction thereof that rotationally correct a captured image to match an image captured by the image capturing device at a preset angle.

2. Description of the Related Art

While photographing, if user operates an image capture device to determine photographic composition for a scene, he/she generally needs one or more additional levels installed on the image capturing device to make sure the image capturing device is situated horizontally. However, such additional levels cause the following problems when creating the figure. For example, the user has to check the position or data of the level closely during scene and keep adjusting the position of the image capturing device continuously, and such manner of manually adjusting the position of the image capturing device may cause low accuracy and poor efficiency.

Besides usage of additional level to adjust the position of the image capturing device, there is another way of post-processing an image by software. The post-processing process of the image, however, is relatively complicated and usually incurs expensive matrix conversion operation for the computation. Algorithms of this sort are generally limited to their use in the operation of rectangular images, such as storing the whole image in a frame buffer.

In addition, when the user operates such image capturing device to capture image, the hand shaking issue usually exists, particularly for a thin and lightweight digital camera, since the stability for the users to hold the digital camera is low, and the hands of the users may shake when pressing the shutter or the force applied by the finger of the users may vibrate the digital camera easily. As a result, a blurred image may be taken. As to a user who holds a digital camera, even if the additional level provides the information of a correct horizontal plane to the user, yet the hand shaking problem still exists at the moment of the users pressing the shutter when the user use such information to create a figure of the scene, and the figure may be tilted and the image may be blurred, and the additional level becomes meaningless in this application.

For user requirements, designing and developing an image capturing device and an image correction for calibrating images to obtain accurate figures demands immediate attention and feasible solutions.

SUMMARY OF THE INVENTION

In view of the aforementioned shortcomings of the prior art, it is a primary objective of the present invention to provide an image capturing device and an image correction thereof to overcome the problem that users want to create a figure for a scene, but fail to capture a clear image due to the hand shaking problem or the force applied by the user's finger, and thus producing an unexpectedly tilted image.

To achieve the foregoing objective, the present invention provides an image capturing device which comprises an image capturing module, a sensing module, a storage module and a processing module. The image capturing module is provided for capturing an image. The sensing module is provided for sensing an included angle between the image capturing device and a horizontal plane. The storage module is provided for storing a rotation compensation data table, wherein the rotation compensation data table contains a plurality of offset angles and a plurality of rotation compensation values for pixels corresponding to each offset angle. The processing module is electrically coupled to the image capturing module, the sensing module and the storage module, and the processing module compares a difference value between an included angle and a preset angle with the rotation compensation data table according to the difference value and rotationally corrects the image to generate a calibrated image, wherein the calibrated image is matched with the image captured by the image capturing device at a preset angle.

The present invention further comprises a setting module electrically coupled to the processing module and provided for setting a first threshold value. While the processing module determines that the included angle is smaller than or equal to a first threshold value, then the processing module will compare the included angle with the rotation compensation data table, and rotationally correct the image to generate a calibrated image, wherein the calibrated image is matched with an image captured by the image capturing device at a horizontal plane.

Wherein, the sensing module detects a first included angle, when the image capturing device is evaluating the presetting operation before capturing the image.

Wherein, the sensing module detects a second included angle, when the image capturing device actually captures the image.

Wherein, while the first included angle is smaller than or equal to the first threshold value, the processing module will compare the second included angle with the rotation compensation data table, and rotationally correct the image to generate a calibrated image, and the calibrated image is matched with an image by the image capturing device at a horizontal plane.

Wherein, while the first included angle is greater than the first threshold value, the processing module will determine the first included angle to be a preset angle and rotationally correct the image, such that the calibrated image is matched with an image captured by the image capturing device at the first included angle.

Wherein, the setting module further sets a second threshold value, and while the difference value is greater than the second threshold value, the processing module will rotationally correct the image based on the difference value, such that the calibrated image is matched with an image captured by the image capturing device at the first included angle.

To achieve the foregoing objective, the present invention further provides an image correction method comprising: capturing an image; sensing an included angle between the image capturing device and a horizontal plane; generating a rotation compensation data table, wherein the rotation compensation data table contains a plurality of offset angles and a plurality of rotation compensation values for a plurality of pixels corresponding to each offset angle; and comparing a difference value between the included angle and a preset angle with the rotation compensation data table, and rotationally correcting the image to generate a calibrated image, wherein the calibrated image is matched with an image captured by the image capturing device at the preset angle.

Wherein, the image correction method of the present invention further comprises the step of setting a first threshold value, and while the included angle is smaller than or equal to first threshold value, the included angle will be compared with the rotation compensation data table, and the image is rotationally corrected to generate a calibrated image, wherein the calibrated image is matched with an image captured by the image capturing device at a horizontal plane.

Wherein, a first included angle is sensed when the image capturing device evaluates the presetting of the image; and a second included angle is sensed when the image capturing device actually captures the image.

Wherein, while the first included angle is smaller than or equal to the first threshold value, the image is rotationally corrected to generate a calibrated image, and the calibrated image is matched with an image captured by the image capturing device at a horizontal plane.

Wherein, the image correction method of the present invention further comprises the step of setting a second threshold value, and while a difference value between the first included angle and the second included angle is greater than second threshold value, the second included angle is compared with the rotation compensation data table, and the image is rotationally corrected to generate a calibrated image, and the calibrated image is matched with an image captured by the image capturing device at a horizontal plane.

Wherein, while the first included angle is greater than the first threshold value, the image is rotationally corrected to match with an image captured by the image capturing device at the first included angle.

Wherein, the image correction method of the present invention further comprises the step of setting a second threshold value, and while the difference value is greater than the second threshold value, the image is rotationally corrected to compensate the difference value, such that the calibrated image is matched with an image captured by the image capturing device at the first included angle.

To achieve the foregoing objective, the present invention further provides an image correction method comprising: means for capturing an image; means for sensing an included angle between the image capturing device and a horizontal plane; means for storing a rotation compensation data table containing a plurality of offset angles and a plurality of rotation compensation values for a plurality of pixels corresponding to each offset angle; and means for comparing a difference value between the included angle and a preset angle with the rotation compensation data table, and rotating and correcting the image according to the difference value to generate a calibrated image, such that the calibrated image is matched with an image captured by the image capturing device at the preset angle To sum up, the image capturing device and the image correction method in accordance with the present invention have one or more of the following advantages:

(1) If a user wants to capture an image at a horizontal plane by the image capturing device, the image capturing device and the image correction method thereof can detect the user's inappropriate hand-holding angle or hand shaking information to immediately correct a tilted image into an image matched with the image captured by the image capturing device at a horizontal plane.

(2) If a user wants to capture an image at a specific angle on a plane by the image capturing device, the image capturing device and the image correction method thereof can detect the user's incorrect hand-holding angle or hand shaking information to immediately correct a tilted image into an image matched with the image captured by the image capturing device at a specific angle on a plane.

(3) The image capturing device and the image correction method determine whether or not the angle of taking a photo by user is tilted intentionally based on a set threshold value, such that the present invention can automatically and correctly correct the image into an image captured at a desired angle by the user.

(4) The image capturing device and the image correction method determine whether it is necessary to modify the user's hand shaking level based on a set threshold value in order to save resources and processing time for correcting the image when the hand shaking condition is acceptable.

DETAILED DESCRIPTION OF THE PREFERRED EMBODIMENTS

The technical characteristics and effects of the present invention will be apparent with the detailed description of preferred embodiment together with the illustration of related drawings as follows.

The image capturing device of the present invention can be a digital camera, a camera phone, a personal digital assistant (PDA), a digital video camera, or any portable electronic device with a camera function. To make it easier to understand the technical characteristics of the present invention, we use the digital camera as an example for describing the invention, but it is noteworthy to point out that the invention is not limited to the digital camera only.

Figure 1:
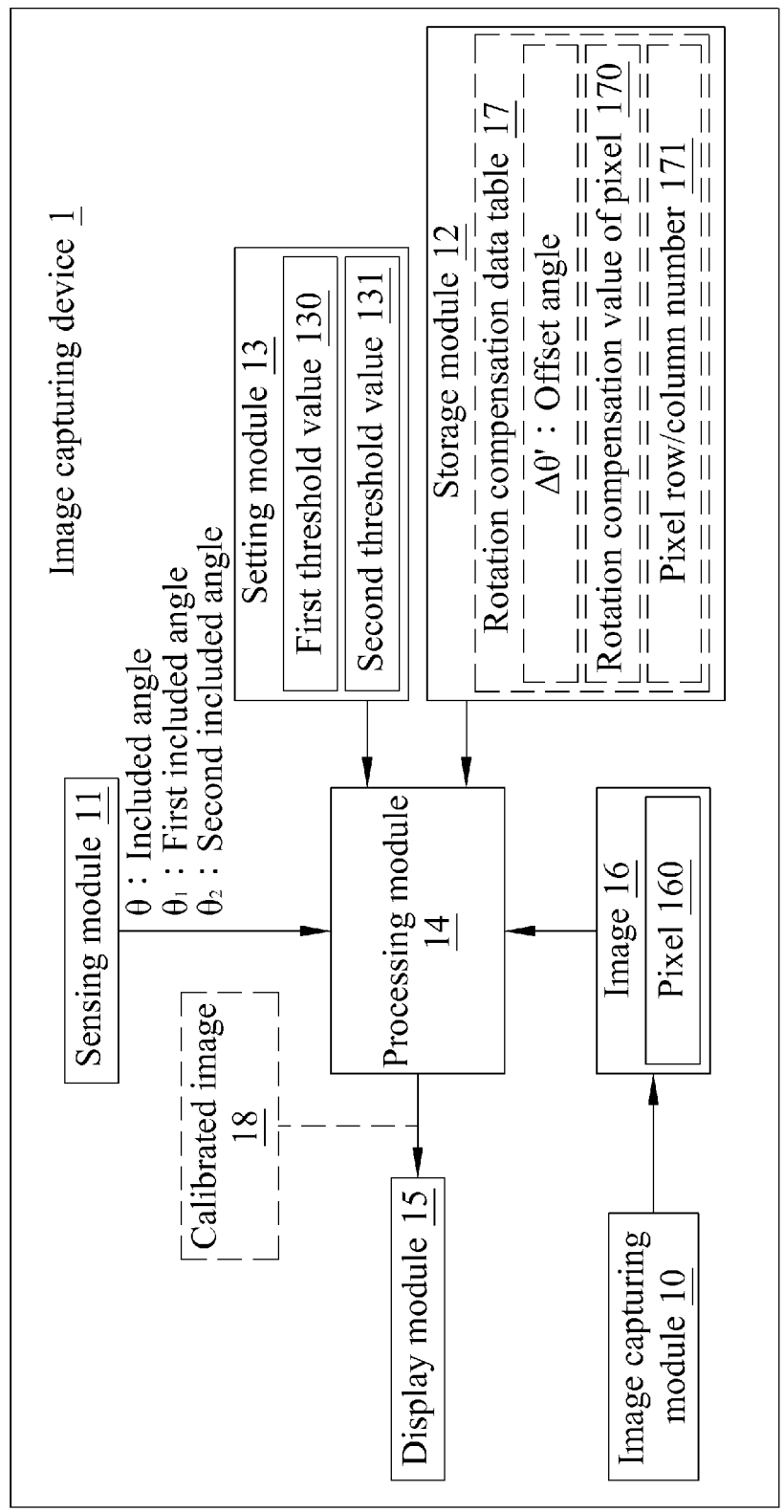
FIG. 1 is a block diagram of an image capturing device in accordance with a preferred embodiment of the present invention.

With reference to FIG. 1 for a block diagram of an image capturing device in accordance with a preferred embodiment of the present invention, the image capturing device 1 comprises an image capturing module 10, a sensing module 11, a storage module 12, a setting module 13, a processing module 14 and a display module 15. The image capturing module 10 can include a lens, a sensing element such as a complementary metal oxide semiconductor (CMOS) or charge coupled device (CCD), an analog/digital circuit, and an image processor, etc. The sensing module 11 can be a combination of an electronic level or a combination of different levels. The storage module 12 can be an embedded memory, an external memory card, or their combination. The processing module 14 is electrically coupled to the image capturing module 10, sensing module 11, storage module 12, setting module 13 and display module 15, and the processing module 14 is a central processing unit (CPU) or a microprocessing unit.

The image capturing module 10 is provided for capturing an image 16, and the image 16 includes a plurality of pixels 160. The sensing module 11 is provided sensing an included angle θ between the image capturing device 1 and a horizontal plane, and the included angle θ has a range from 0° to 90° and represents the inclination of the image capturing device 1, wherein while the included angle θ is equal to 0°, it means that the image capturing device 1 is situated at a horizontal plane. The storage module 12 is provided for storing a rotation compensation data table 17, and the rotation compensation data table 17 contains a plurality of offset angles Δθ' and a plurality of rotation compensation values 170 for a plurality of pixels corresponding to each offset angle Δθ'. The setting module 13 is provided for setting a first threshold value 130, and the first threshold value 130 can be stored in the storage module 12. The first threshold value 130 is used by the processing module 14 to determine a user's desired photographing angle (which is the preset angle $\theta_0$). The processing module 14 looks up a pixel row/column number 171 of the image with the same resolution and an offset angle Δθ' with the same difference value from the rotation compensation data table 17 according to a difference value Δθ between the included angle θ and the preset angle $\theta_0$ to obtain a plurality of rotation compensation values 170 for the plurality of pixels corresponding to the offset angle Δθ', so as to rotationally correct a image 16 to generate a calibrated image 18, wherein the calibrated image 18 is matched to an image captured by the image capturing device 1 of the preset angle $\theta_0$. The display module 15 is provided for receiving a control of the processing module 14 to display the calibrated image 18. Besides, all those skilled in the art may randomly combine the functional modules into an integrated means or divide them into each detailed functional means, depending on the convenience of design.

Figure 2:
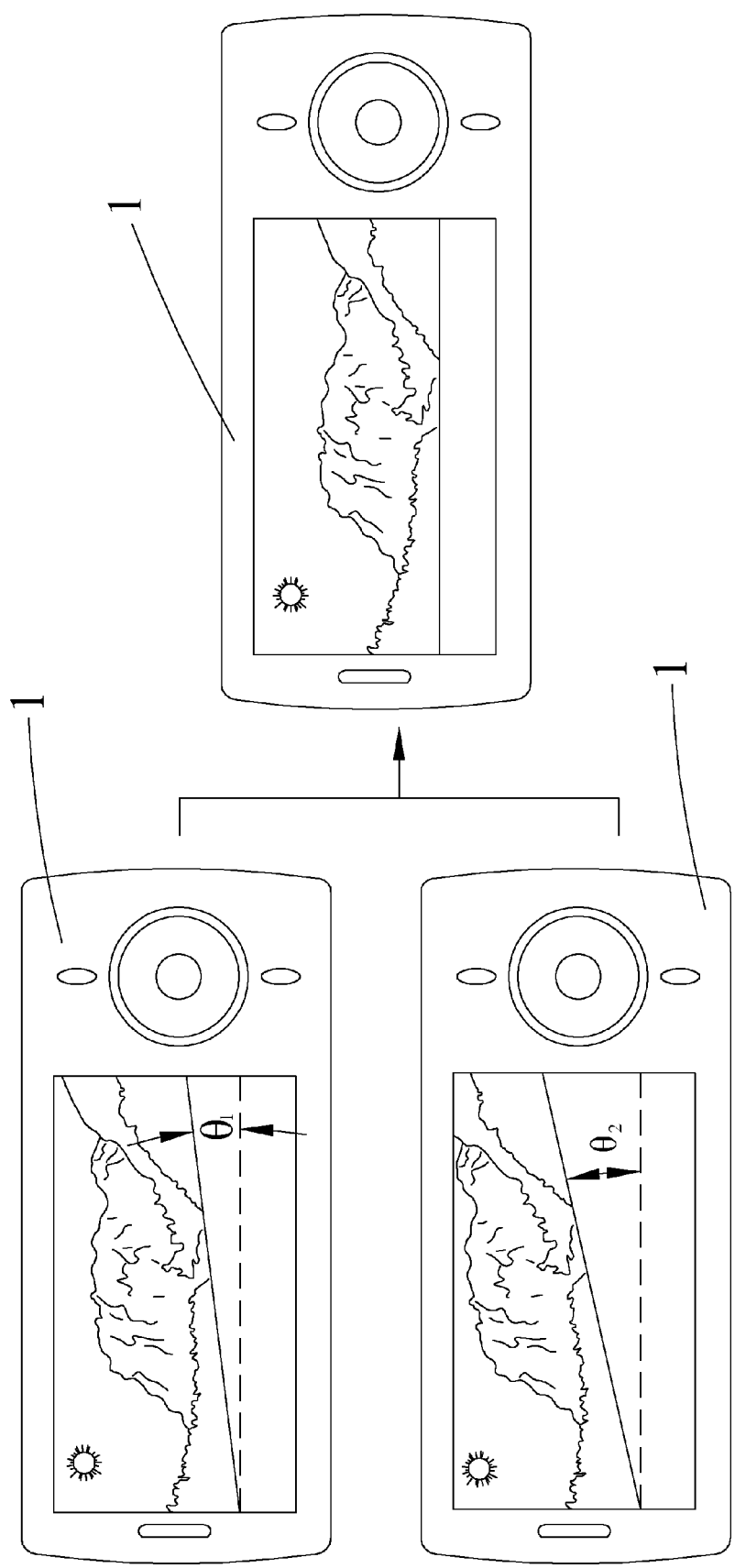
FIG. 2 is a schematic view of an image capturing device in accordance with a first preferred embodiment of the present invention.

With reference to FIG. 2 for a schematic view of an in accordance with a first preferred embodiment of the present invention, the image capturing device 1 can be a digital camera in this preferred embodiment, and the process for a user to use the image capturing device 1 to capture an image is generally divided into two processes, wherein the first process is to evaluate the setting of capturing the image (generally referred to as the S1 process) and the second process is to actually capture the image (generally referred to as the S2 process). In the S1 process, the sensing module 11 can detect an inclination of the image capturing device 1 and represent the inclination by a first included angle $\theta_1$. In the S2 process, since the user presses a shutter of the image capturing device 1, therefore the image capturing device 1 may be tilted further, and the sensing module 11 can detect the inclination of the image capturing device 1 during the S2 process and represent such inclination by a second included angle $\theta_2$. In other words, if $\theta_1$ and $\theta_2$ are unequal, then it means that a hand shaking phenomenon of the user occurs in the S2 process. Wherein, the first included angle $\theta_1$ is set to a first threshold value 130, such that the processing module 14 can determine the angle (which is a preset angle $\theta_0$) of taking a photo by the user, and the determination of the processing module 14 will not be affected by any unexpected angle change due to the hand shaking phenomenon (i.e. the difference between $\theta_1$ and $\theta_2$). In this preferred embodiment, the resolution of the image is equal to 1024×768, the first threshold value 130 is equal to 5°, the first included angle $\theta_1$ is equal to 3° and the second included angle $\theta_2$ is equal to 7°. Now, the first included angle $\theta_1$ is smaller than the first threshold value 130, so that the processing module 14 determines that the user intends to use the horizontal plane as a reference plane for creating the figure of a scene. In other words, the preset angle $\theta_0$ is equal to 0°, and the first included angle $\theta_1$ is the error of the horizontal plane determined by the user. Now, the processing module 14 looks for an offset angle Δθ'=$\theta_2$=7° and the pixel row/column number 171 equal to 1024×768 in the rotation compensation data table 17 to obtain a plurality of rotation compensation values 170 for the plurality of pixels corresponding to Δθ'=7° and rotationally correct the image 16 according to the found results to generate a calibrated image 18, such that the calibrated image 18 is matched with an image captured by the image capturing device 1 at a horizontal plane. It is noteworthy to point out that the processing module 14 determines that the user uses the horizontal plane as a reference plane for creating the figure of a scene on the condition that the first included angle $\theta_1$ is smaller than or equal to the first threshold value 130. In this preferred embodiment, while the first included angle $\theta_1$ is equal to 5°, the processing module 14 will still determine that the user intends to use the horizontal plane as a reference plane for creating the scene. In addition, under the condition of this preferred embodiment, the first threshold value 130 can also be used by the processing module 14 to determine whether or not the preset angle is equal to 1°, 2°, or other values, and the application of the invention is not just limited to the correction of the image 16 to match it with an image captured by the image capturing device 1 at the horizontal plane.

Figure 3:
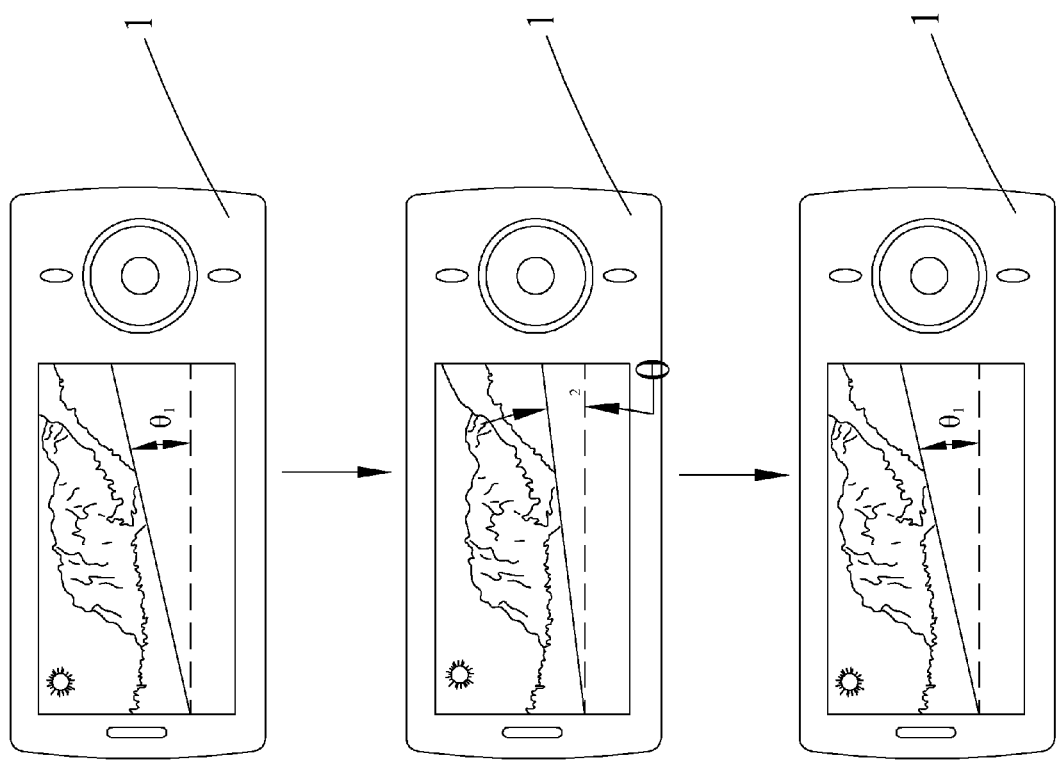
FIG. 3 is a schematic view of an image capturing device in accordance with a second preferred embodiment of the present invention.

With reference to FIG. 3 for a schematic view of an image capturing device in accordance with a second preferred embodiment of the present invention, the resolution of the image is equal to 1024×768, the first threshold value 130 is equal to 5°, the first included angle $\theta_1$ is equal to 10° and the second included angle $\theta_2$ is equal to 3°. Since the first included angle $\theta_1$ is greater than the first threshold value 130, the processing module 14 determines that the user intentionally use the plane of the first included angle $\theta_1$ as the reference plane for creating the figure of a scene. In other words, the preset angle $\theta_0$ is equal to 10°, and the difference value Δθ'=7° between the second included angle $\theta_2$ and the first included angle $\theta_1$ is an unexpected angular change caused by the hand shaking in the S2 process. Now, the processing module 14 looks for an offset angle Δθ'=Δθ=7° and the pixel row/column number 171 equal to 1024×768 from the rotation compensation data table 17 based on the difference value Δθ'=7° to obtain a plurality of rotation compensation values 170 for the plurality of pixels corresponding to the Δθ'=7° and rotationally correct an image 16 to generate a calibrated image 18, wherein the calibrated image 18 is matched with an image captured at the plane having the first included angle $\theta_1$ (which equals to 10° in this preferred embodiment) by the image capturing device 1.

With reference to Table 1 as follows, the table shows the rotation compensation data table 17 of the aforementioned preferred embodiments:

TABLE 1 rotation compensation data table

| Offset Angle Δθ' | Corresponding Rotation Compensation Value | |
|---|---|---|
| Δθ' = 1° | Coordinates of each pixel before the correction (x0, y0) (1, 0) . . . (513, 384) . . . (1025, 768) | Rotation compensation value for each pixel r (x1 − x0, y1 − y0) (−1, 0) |
| | Coordinates of each pixel after the correction (x1, y1) (0, 0) . . . (512, 384) . . . (1024, 768) | Pixel Row/Column Number 1024 × 768 |
| Δθ' = 2° | Coordinates of each pixel before the correction (x0, y0) Coordinates of each pixel after the correction (x1, y1) | Rotation compensation value for each pixel (x1 − x0, y1 − y0) Pixel Row/Column Number |
| . . . | . . . | . . . |
| Δθ' = 90° | Coordinates of each pixel before the correction (x0, y0) Coordinates of each pixel after the correction (x1, y1) | Rotation compensation value for each pixel (x1 − x0, y1 − y0) Pixel Row/Column Number |

In addition, different offset angles Δθ' will correspond to different rotation compensation values, and the rotation compensation value of the pixel varies with different resolutions and different positions of each pixel at each resolution, and thus Table 1 only provides one of the embodiments of the rotation compensation data tables 17 as an example. In the rotation compensation data table 17 as shown in Table 1, the processing module 14 looks for an offset angle $\Delta\theta'$ equal to the difference value 40 between the included angle $\theta$ and the preset angle $\theta_0$ and the pixel row/column number 171 from the rotation compensation data table 17 to obtain a plurality of rotation compensation values 170 of a plurality of pixels corresponding to the offset angle $\Delta\theta'$, and rotationally correct an image 16 to generate a calibrated image 18, such that the calibrated image 18 is matched with an image captured by the image capturing device 1 of the preset angle $\theta_0$. It is noteworthy to point out that a point extrapolation or interpolation method or the feature of the area of a captured image being greater than the area of a standard image can be used to rotationally correct the image 16 at will without the problem of having pixels at edges, so as to maintain the integrity of the image after the image 16 is rotationally corrected.

In addition to the function of setting the first threshold value 130, the setting module 13 of the present invention can also set a second threshold value 131, wherein the second threshold value 131 is set for the difference value $\Delta\theta$ and used for determining whether or not it is necessary for the processing module 14 to correct the image 16. The difference value $\Delta\theta$ is the difference between the preset angle $\theta_0$ and the included angle $\theta$, which is also the difference between a user's desired inclination of taking a picture and the actual photographing angle. While the difference value $\Delta\theta$ is greater than second threshold value 131, it means that the difference between the actual photographing angle and the preset angle $\theta_0$ has exceeded the acceptable range of the processing module 14. Now, the processing module 14 will consider compensating the error for such difference value $\Delta\theta$, and thus the processing module 14 will look for an offset angle $\Delta\theta'$ equal to the difference value in the rotation compensation data table 17 to obtain a plurality of rotation compensation values 170 of a plurality of pixels corresponding to the offset angle $\Delta\theta'$ to rotationally correct the image 16 to generate a calibrated image 18, such that the calibrated image 18 is matched with an image captured by the image capturing device 1 of the preset angle $\theta_0$. If the difference value $\Delta\theta$ is smaller than or equal to second threshold value 131, the processing module 14 will determine that the difference value $\Delta\theta$ is a neglectable error, and the image 16 will be displayed on the display module 15 without performing any correction, so as to reduce the time for the image capturing device 1 to process the image 16.

Even though the concept of the image correction method of the present invention has been described in the process of describing the image capturing device of the invention already, the following flow charts are provided for illustrating the details of the invention more clearly.

Figure 4:
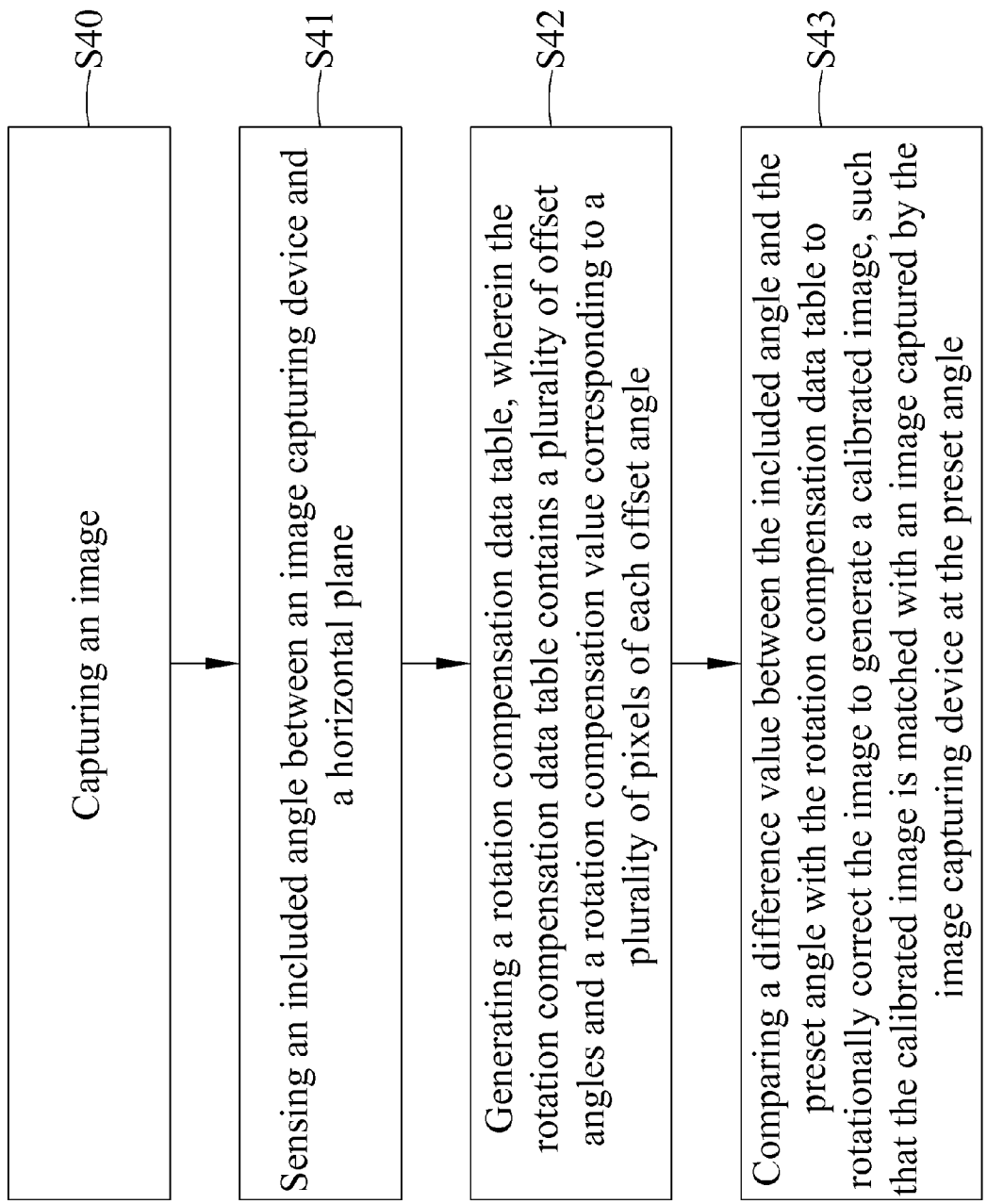
FIG. 4 is a first flow chart of an image correction method of the present invention.

With reference to FIG. 4 for a first flow chart of an image correction method of the present invention, the image correction method comprises the steps of:

(S40) capturing an image;
(S41) sensing an included angle between an image capturing device and a horizontal plane;
(S42) generating a rotation compensation data table, wherein the rotation compensation data table contains a plurality of offset angles and a plurality of rotation compensation values for a plurality of pixels corresponding to each offset angle; and
(S43) comparing a difference value between the included angle and the preset angle with the rotation compensation data table to rotationally correct the image to generate a calibrated image, such that the calibrated image is matched with an image captured by the image capturing device at the preset angle.

Figure 5:
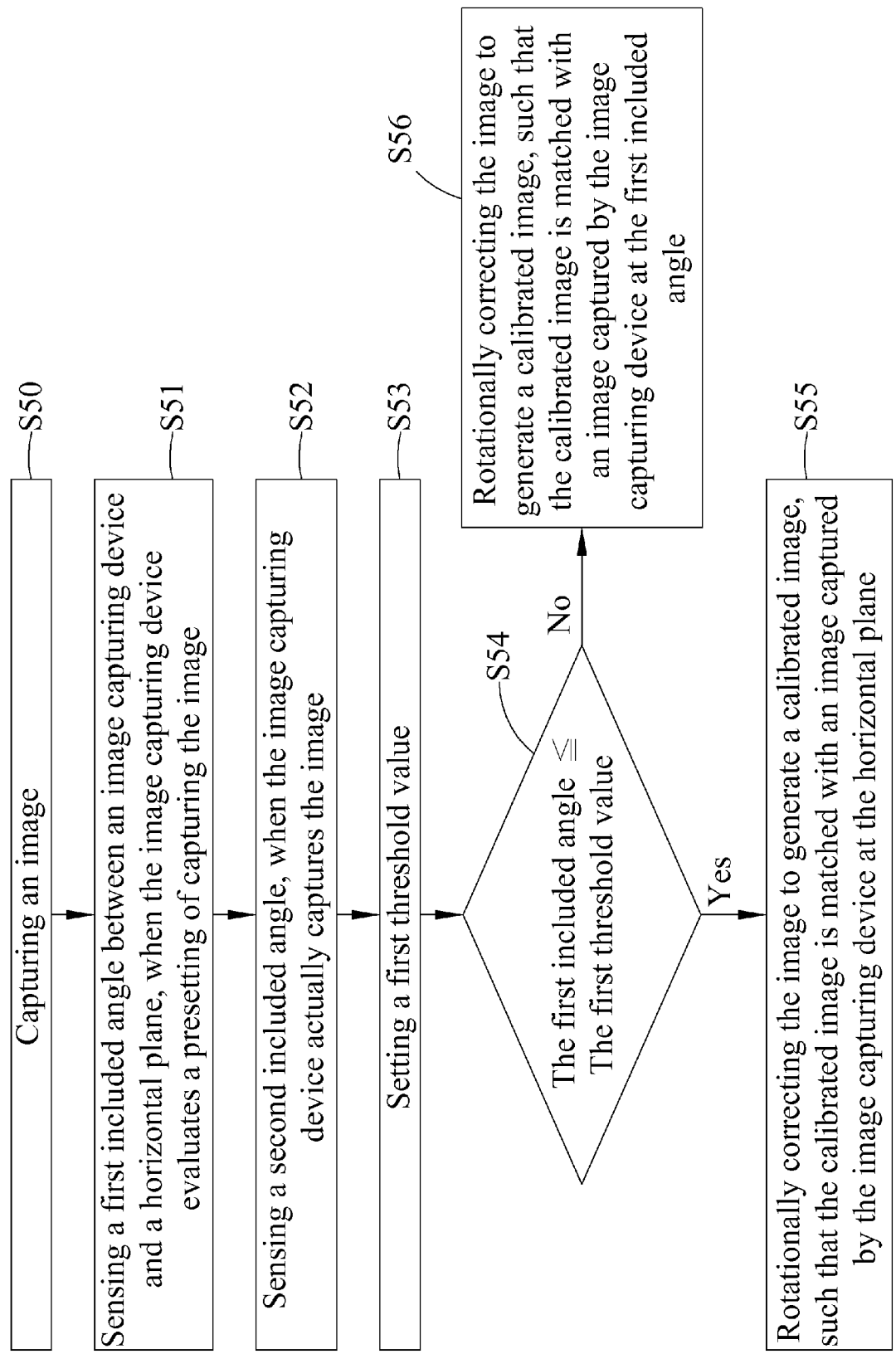
FIG. 5 is a second flow chart of an image correction method of the present invention.

With reference to FIG. 5 for a second flow chart of an image correction method of the present invention, the image correction method comprises the steps of:

(S50) capturing an image;
(S51) sensing a first included angle between the image capturing device and a horizontal plane, when the image capturing device evaluates a presetting of capturing the image;
(S52) sensing a second included angle when the image capturing device actually captures the image;
(S53) setting a first threshold value;
(S54) determining whether or not the first included angle is smaller than or equal to the first threshold value;
(S55) generating a calibrated image matched with an image captured by the image capturing device at a horizontal plane, if the first included angle is smaller than or equal to the first threshold value; and
(S56) generating a calibrated image matched with an image captured by the image capturing device at the first included angle, if the first included angle is not smaller than or equal to the first threshold value.

Figure 6:
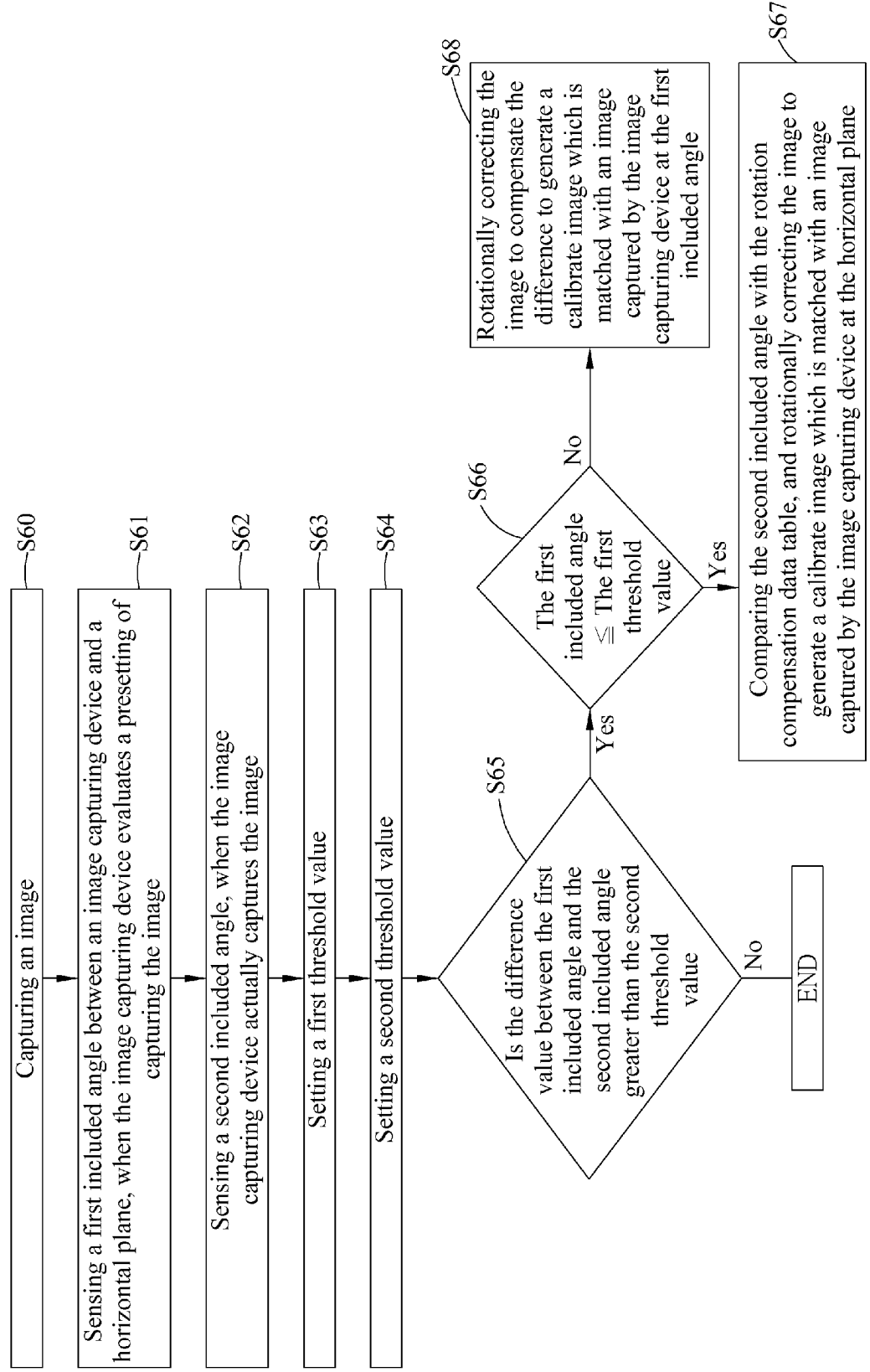
FIG. 6 is a third flow chart of an image correction method of the present invention.

With reference to FIG. 6 for a third flow chart of an image correction method of the present invention, the image correction method comprises the steps of:

(S60) capturing an image;
(S61) sensing a first included angle between the image capturing device and a horizontal plane, when the image capturing device evaluates a presetting of capturing the image;
(S62) sensing a second included angle when the image capturing device actually captures the image;
(S63) setting a first threshold value;
(S64) setting a second threshold value;
(S65) determining whether or not a difference value between the first included angle and the second included angle is greater than the second threshold value;
(S66) determining whether or not the first included angle is smaller than or equal to first threshold value that, if the difference value between the first included angle and the second included angle is greater than the second threshold value;
(S67) comparing the second included angle with the rotation compensation data table while the first included angle is smaller than or equal to first threshold value, wherein the calibrated image is matched with an image captured by the image capturing device at the horizontal plane; and
(S68) rotationally correcting the image to compensate the difference value while the first included angle is greater than first threshold value, such that the calibrated image is matched with an image captured by the image capturing device at the first included angle.

The detailed description and implementation of the image correction method of the image capturing device in accordance with the present invention have been described in the foregoing section of the image capturing device already, and thus will not be described here again.

In summation of the description above, the image capturing device and the image correction method of the present invention generate a rotation compensation data table containing a plurality of offset angles and a plurality of rotation compensation values of a plurality of pixels corresponding to each offset angle to perform a rotational correction of the image based on the rotation compensation data table. Preferably, the threshold value is set, such that the processing module can determine whether or not it is necessary to correct the image and confirm the preset angle, so that the image capturing device and the image correction method of the present invention can automatically determine the user's desired photographing angle and correct the image correctly.

The present invention has been described with some preferred embodiments thereof and it is understood that many changes and modifications in the described embodiments can be carried out without departing from the scope and the spirit of the invention that is intended to be limited only by the appended claims

What is claimed is:

1. An image capturing device, comprising:
an image capturing module capturing an image;
a sensing module sensing an included angle between the image capturing device and a horizontal plane;
a storage module storing a rotation compensation data table containing a plurality of offset angles and a plurality of rotation compensation values for a plurality of pixels corresponding to each offset angle; and
a processing module, electrically coupled to the image capturing module, the sensing module and the storage module, comparing a difference value between the included angle and a preset angle with the rotation compensation data table, and rotating and correcting the image according to the difference value to generate a calibrated image, and the calibrated image being matched with an image captured by the image capturing device at the preset angle.

2. The image capturing device of claim 1, further comprising a setting module electrically coupled to the processing module, wherein the setting module setting a first threshold value, and while the processing module determines that the included angle is smaller than or equal to the first threshold value, the processing module compares the included angle with the rotation compensation data table to rotationally correct the image to generate the calibrated image, and wherein the calibrated image is matched with an image captured by the image capturing device at the horizontal plane.

3. The image capturing device of claim 2, wherein the sensing module senses a first included angle when the image capturing device evaluates a pre-setting for capturing the image, and senses a second included angle when the image capturing device actually captures the image.

4. The image capturing device of claim 3, wherein while the first included angle is smaller than or equal to the first threshold value, the processing module compares the second included angle with the rotation compensation data table to rotationally correct the image to generate the calibrated image, and wherein the calibrated image is matched with an image captured by the image capturing device at the horizontal plane.

5. The image capturing device of claim 3, wherein the processing module determines that the first included angle is equal to the preset angle while the first included angle is greater than the first threshold value, such that the calibrated image is matched with an image captured by the image capturing device at the first included angle.

6. The image capturing device of claim 3, wherein the setting module further sets a second threshold value, and while the difference value is greater than the second threshold value, the processing module performs a rotational correction of the difference value to the image, such that the calibrated image is matched with an image captured by the image capturing device at the first included angle.

7. An image correction method, used in an image capturing device, and comprising the steps of:
capturing an image;
sensing an included angle between the image capturing device and a horizontal plane;
generating a rotation compensation data table, wherein the rotation compensation data table contains a plurality of offset angles and a plurality of rotation compensation values for a plurality of pixels corresponding to each offset angle; and
comparing the difference value with the rotation compensation data table according to a difference value between the included angle and a preset angle to rotationally correct the image to generate a calibrated image, wherein the calibrated image is matched with an image captured by the image capturing device at the preset angle.

8. The image correction method of claim 7, further comprising the steps of:
setting a first threshold value; and
comparing the included angle with the rotation compensation data table, and rotating and correcting the image to generate the calibrated image while the included angle is smaller than or equal to the first threshold value, wherein the calibrated image is matched with an image captured by the image capturing device at the horizontal plane.

9. The image correction method of claim 8, further comprising the step of:
sensing a first included angle when the image capturing device evaluates a presetting for capturing the image; and
sensing a second included angle when the image capturing device actually captures the image.

10. The image correction method of claim 9, further comprising the step of:
rotating and correcting the image to generate the calibrated image, while the first included angle is smaller than or equal to the first threshold value, wherein the calibrated image is matched with an image captured by the image capturing device at the horizontal plane.

11. The image correction method of claim 10, further comprising the steps of:
setting a second threshold value; and
comparing the second included angle with the rotation compensation data table and rotating and correcting the image to generate the calibrated image while a difference value between the first included angle and the second included angle is greater than the second threshold value, wherein the calibrated image is matched with an image captured by the image capturing device at the horizontal plane.

12. The image correction method of claim 9, further comprising the step of rotating and correcting the image to generate the calibrated image while the first included angle is greater than the first threshold value, wherein the calibrated image is matched with an image captured by the image capturing device at the first included angle.

13. The image correction method of claim 12, further comprising the steps of:
setting a second threshold value; and
rotating and correcting the image to compensate the difference value and generate the calibrated image while the difference value is greater than the second threshold value, such that the calibrated image is matched with an image captured by the image capturing device at the first included angle.

14. An image capturing device, comprising:
means for capturing an image;
means for sensing an included angle between the image capturing device and a horizontal plane;
means for storing a rotation compensation data table containing a plurality of offset angles and a plurality of rotation compensation values for a plurality of pixels corresponding to each offset angle; and
means for comparing a difference value between the included angle and a preset angle with the rotation compensation data table, and rotating and correcting the image according to the difference value to generate a calibrated image, and the calibrated image being matched with an image captured by the image capturing device at the preset angle.

* * * * *